(12) United States Patent
Oguni

(10) Patent No.: US 9,786,435 B2
(45) Date of Patent: Oct. 10, 2017

(54) METHOD FOR PRODUCING MULTILAYER CERAMIC CAPACITOR

(71) Applicant: Murata Manufacturing Co., Ltd., Nagaokakyo-shi, Kyoto-fu (JP)

(72) Inventor: Toshimi Oguni, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/166,376

(22) Filed: May 27, 2016

(65) Prior Publication Data

US 2016/0358711 A1 Dec. 8, 2016

(30) Foreign Application Priority Data

Jun. 5, 2015 (JP) ................. 2015-114874

(51) Int. Cl.
*H01G 4/12* (2006.01)
*H01G 4/012* (2006.01)
*H01G 4/248* (2006.01)
*H01G 4/30* (2006.01)
*C04B 35/465* (2006.01)
*C04B 35/468* (2006.01)
*H01G 4/008* (2006.01)
*H01G 4/232* (2006.01)

(52) U.S. Cl.
CPC ........ *H01G 4/1227* (2013.01); *C04B 35/465* (2013.01); *H01G 4/30* (2013.01); *C04B 35/468* (2013.01); *C04B 35/4682* (2013.01); *H01G 4/0085* (2013.01); *H01G 4/232* (2013.01)

(58) Field of Classification Search
CPC ...... H01G 4/1227; H01G 4/30; H01G 4/0085; H01G 4/232; C04B 35/465; C04B 35/468; C04B 35/4682
USPC .......................................................... 427/79
See application file for complete search history.

(56) References Cited

U.S. PATENT DOCUMENTS

2011/0318583 A1* 12/2011 Park ................... C01G 23/003
428/402
2014/0049876 A1* 2/2014 Yao ......................... H01G 4/30
361/321.4

FOREIGN PATENT DOCUMENTS

JP 2014165447 A 9/2014

\* cited by examiner

*Primary Examiner* — Katherine A Bareford
*Assistant Examiner* — Christina McClure
(74) *Attorney, Agent, or Firm* — Arent Fox LLP

(57) ABSTRACT

A method for producing a multilayer ceramic capacitor that includes preparing a dielectric ceramic material by mixing a perovskite compound, a Re compound, a Mn compound, a Mg compound, and a Si compound. The perovskite compound contains Ba and Ti and has $1.2 \times 10^{15}$ or more and $4.5 \times 10^{15}$ or less Ba vacancies per gram. Re in the Re compound is at least one element selected from Y, Gd, Tb, Dy, Ho, Er, and Yb. Green sheets containing the dielectric ceramic material are then formed. Inner electrode patterns are then formed on some of the green sheets. An unsintered capacitor body is then formed by stacking the green sheets, some of which have the inner electrode patterns formed thereon. Sintering of the unsintered capacitor body is then conducted.

4 Claims, 2 Drawing Sheets

US 9,786,435 B2

METHOD FOR PRODUCING MULTILAYER CERAMIC CAPACITOR

CROSS REFERENCE TO RELATED APPLICATIONS

The present application claims priority to Japanese Patent Application No. 2015-114874, filed Jun. 5, 2015, the entire contents of which are incorporated herein by reference.

BACKGROUND OF THE INVENTION

Field of the Invention

The present disclosure relates to a method for producing a highly reliable multilayer ceramic capacitor such as a multilayer ceramic capacitor for industrial equipment.

Description of the Related Art

In recent years, multilayer ceramic capacitors have been increasingly used in industrial equipment such as automobiles as well as consumer electronics such as communications devices. Such multilayer ceramic capacitors are required to be highly reliable.

An example of a multilayer ceramic capacitor having such uses is disclosed in Japanese Unexamined Patent Application Publication No. 2014-165447. The multilayer ceramic capacitor disclosed in this document includes $BaTiO_3$-based dielectric ceramic layers. These dielectric ceramic layers have $4.2 \times 10^{12}$ or less oxygen vacancies per $mm^3$.

The document states that this multilayer ceramic capacitor does not have many carriers (oxygen vacancies) which move therein in response to application of a DC voltage and thus is highly insulating and has a high dielectric strength.

The following is a description of the studies conducted by the inventor to accomplish the present disclosure.

In order to improve the reliability of a multilayer ceramic capacitor which includes $BaTiO_3$-based dielectric ceramic layers, it is necessary to suppress the movement of oxygen vacancies within the dielectric ceramic layers during application of a DC voltage. In this description, the term "reliability" denotes the time taken for insulation resistance to decrease to a certain level in a high-temperature loading test (this time taken hereinafter may be referred to as lifetime under high-temperature loading). It seems that an effective way to suppress the movement of oxygen vacancies is to replace Ba ions in the A sites (12-fold coordination surrounded by $O^{2-}$ ions) of the $BaTiO_3$ crystal lattice with rare-earth metal ions such as Dy ions or Ho ions.

The replacement of Ba ions having a charge of +2 with rare-earth metal ions having a charge of +3 creates excess positive charges. As a result, Ba vacancies, which appear to have a relative charge of −2, are formed to compensate the positive charges. These Ba vacancies form stable defect pairs with the oxygen vacancies which appear to have a relative charge of +2. Since the Ba vacancies do not move easily even when a DC voltage is applied, the oxygen vacancies captured by the Ba vacancies also do not move easily.

That is, the reliability of a multilayer ceramic capacitor including $BaTiO_3$-based dielectric ceramic layers depends on how many rare-earth metal ions have entered the A sites of $BaTiO_3$. It seems here that the rare-earth metal ions can enter the A sites by replacing the Ba vacancies already existing in the crystal lattice more easily than by pushing out the Ba ions of $BaTiO_3$.

Assuming that rare-earth metal ions cannot easily enter the A sites of $BaTiO_3$ unless the A sites have Ba vacancies, when a dielectric ceramic material containing a rare-earth metal compound is sintered, the rare-earth metal compound in the dielectric ceramic material becomes localized in the grain boundaries of the resulting sintered dielectric ceramic layers. When a DC voltage is applied across these dielectric ceramic layers, the electric field may concentrate locally in the position of the rare-earth metal compound. That is, too small a number of Ba vacancies may cause localization of the rare-earth metal compound and this may result in a reduction in reliability.

On the other hand, in the case where the number of Ba vacancies is too high in the $BaTiO_3$ which is the base material for the dielectric ceramic layers, the $BaTiO_3$ particles become too active during sintering of the dielectric ceramic layers and are readily "necked" together. This leads to easy grain growth and, as a result, the ceramic structure of the sintered dielectric ceramic layers may become uneven. When a DC voltage is applied across these layers, local concentration of the electric field may occur due to the unevenness of the ceramic structure. That is, too many Ba vacancies may cause unevenness in the ceramic structure and this may result in a reduction in reliability.

As has been described, it appears that the Ba vacancies in the $BaTiO_3$ which is the base material for the dielectric ceramic layers affect the reliability of a multilayer ceramic capacitor. However, the foregoing document provides no mention that the Ba vacancies in the $BaTiO_3$ which is the base material for the dielectric ceramic layers significantly affect the reliability of a multilayer ceramic capacitor.

SUMMARY OF THE INVENTION

Accordingly, it is an object of the present disclosure to provide a method for producing a highly-reliable multilayer ceramic capacitor with a focus on the number of Ba vacancies in a perovskite compound used as the base material for dielectric ceramic layers.

In order to attain the above object, a method for producing a multilayer ceramic capacitor according to preferred embodiments of the present disclosure improves the $BaTiO_3$ which is a base material for dielectric ceramic layers. This increases the reliability of a multilayer ceramic capacitor.

According to preferred embodiments of the present disclosure, a method for producing a multilayer ceramic capacitor includes the following first to fifth steps. The multilayer ceramic capacitor includes: a capacitor body including a stack of dielectric ceramic layers and inner electrodes; and outer electrodes. The inner electrodes are disposed between the dielectric ceramic layers. The outer electrodes are disposed at respective different positions on the outer surface of the capacitor body so as to be electrically connected to the inner electrodes.

The first step involves preparing a dielectric ceramic material by mixing a perovskite compound containing Ba and Ti, a Re compound, a Mn compound, a Mg compound, and a Si compound so that the amounts of elements in the compounds satisfy the following first requirement. Re is at least one selected from the group consisting of Y, Gd, Tb, Dy, Ho, Er, and Yb. The amount of Ba vacancies in the perovskite compound has $1.2 \times 10^{15}$ or more vacancies per gram and $4.5 \times 10^{15}$ or less vacancies per gram.

A number of molar parts of each element with respect to 1 molar part of the Ti of the first requirement is as follows: an amount a of Re: 0.0010 molar parts$\leq a \leq$0.050 molar parts; an amount b of Mn: 0.0005 molar parts$\leq b \leq$0.040 molar parts; an amount c of Mg: 0 molar parts$\leq c \leq$0.030 molar parts; an amount d of Si: 0.0020 molar parts$\leq d \leq$0.050 molar parts; and a molar ratio m of Ba to Ti: 1.001≤m≤1.035 (this ratio hereinafter may be referred to as the Ba/Ti ratio).

The second step involves forming green sheets containing the dielectric ceramic material.

The third step involves forming inner electrode patterns on some of the green sheets.

The fourth step involves forming an unsintered capacitor body by stacking the green sheets, some of which have the inner electrode patterns formed thereon.

The fifth step involves obtaining the capacitor body by sintering the unsintered capacitor body.

The above-described method for producing a multilayer ceramic capacitor includes the above-described first to fifth steps. In the first step, the perovskite compound, which is an ingredient for the dielectric ceramic material, has $1.2 \times 10^{15}$ or more Ba vacancies per gram and $4.5 \times 10^{15}$ or less Ba vacancies per gram.

In the case where a perovskite compound originally containing the above number of Ba vacancies is used as a base material, the following seems to occur. During sintering, the rare-earth metal ions readily enter the A sites of the perovskite compound which have the Ba vacancies. As a result, new vacancies are formed at the A sites for electrical neutrality. Then, the A-site vacancies, which include the original Ba vacancies of the perovskite compound and the new vacancies, form stable defect pairs with oxygen vacancies. This suppresses the movement of the oxygen vacancies captured by the A-site vacancies.

Furthermore, the rare-earth metal compound in the dielectric ceramic material is suppressed from being localized in the grain boundaries of the resulting sintered dielectric ceramic material. That is, the local concentration of the electric field is suppressed in the dielectric ceramic material. Furthermore, the $BaTiO_3$ particles do not become too active and thus abnormal grain growth is suppressed. This suppresses local concentration of the electric field attributed to unevenness of the ceramic structure. As has been described, the method for producing a multilayer ceramic capacitor according to preferred embodiments of the present disclosure improves the reliability of a multilayer ceramic capacitor.

The method for producing a multilayer ceramic capacitor according to preferred embodiments of the present disclosure is preferably structured as described below. Specifically, the first step includes adding a V compound and an Al compound when preparing the dielectric ceramic material so that the amounts of the elements in the dielectric ceramic layers satisfy the second requirement as well as the first requirement. A number of molar parts of each element with respect to 1 molar part of the Ti of the second requirement is as follows: an amount e of V: 0.00010 molar parts≤e≤0.0050 molar parts; and an amount f of Al: 0.00010 molar parts≤f≤0.0030 molar parts.

The method for producing a multilayer ceramic capacitor described above is structured such that the dielectric ceramic layers contain V and Al in amounts mentioned above. This makes it possible to further improve reliability.

Other features, elements, characteristics and advantages of the present disclosure will become more apparent from the following detailed description of preferred embodiments of the present disclosure with reference to the attached drawings.

DESCRIPTION OF THE PREFERRED EMBODIMENTS

The following describes characteristics of the present disclosure in more detail on the basis of embodiments of the present disclosure.

<Structure of Multilayer Ceramic Capacitor>

Figure 1:
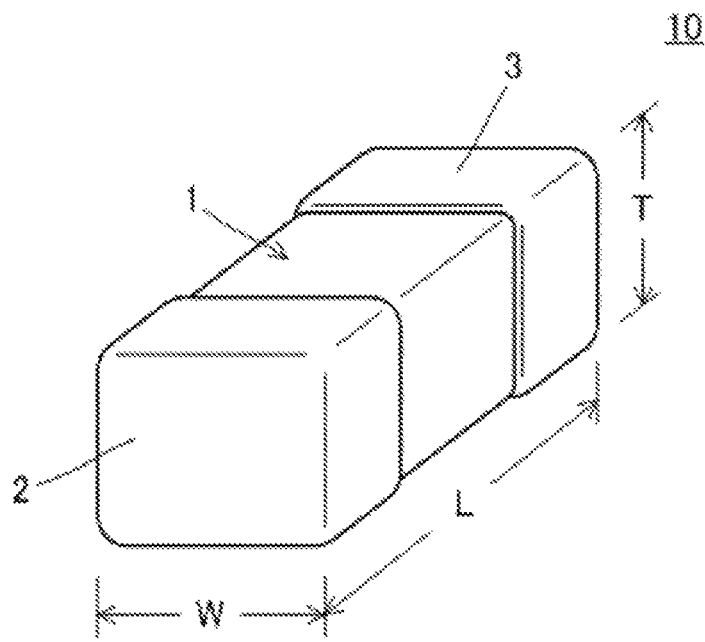
FIG. 1 is a perspective view showing the appearance of a multilayer ceramic capacitor of an embodiment of the present disclosure.
Figure 2:
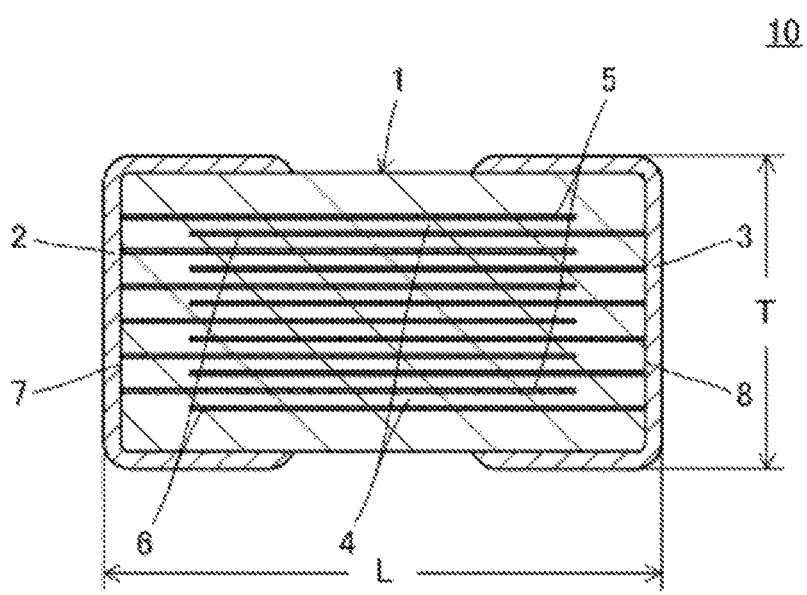
FIG. 2 is a cross-sectional view of the multilayer ceramic capacitor shown in FIG. 1.

A multilayer ceramic capacitor 10 of an embodiment of the present disclosure is described with reference to FIGS. 1 and 2. FIG. 1 is a perspective view showing the appearance of the multilayer ceramic capacitor 10. FIG. 2 is a longitudinal cross-sectional view taken substantially at half the width W of the multilayer ceramic capacitor 10 of FIG. 1, in which a cross section (L-T cross section) defined by the length L and the thickness T is visible.

The multilayer ceramic capacitor 10 includes a capacitor body 1. The capacitor body 1 includes a stack of dielectric ceramic layers 4 with inner electrodes 5 and 6 sandwiched between the dielectric ceramic layers 4.

Each of the inner electrodes 5 and 6 extends to the outer surface of the capacitor body 1. In the present embodiment, each inner electrode 5 extends to one end face 7 of the capacitor body 1 and each inner electrode 6 extends to the other end face 8 of the capacitor body 1. The inner electrodes 5 and 6 are arranged one above the other in an alternating manner in the capacitor body 1.

The capacitor body 1 has, on its outer surface, an outer electrode 2 on the end face 7. The capacitor body 1 further has an outer electrode 3 on the end face 8. The outer electrodes 2 and 3 may be coated with a first plating layer made from Ni, Cu, or the like if necessary and may be further coated with a second plating layer made from solder, Sn, or the like if necessary.

<Method for Producing Multilayer Ceramic Capacitor>

The following describes a method for producing the multilayer ceramic capacitor 10 in the order of production.

First Step (Step of Preparing Dielectric Ceramic Material)

The first step involves preparing a dielectric ceramic material by mixing a perovskite compound containing Ba and Ti, a Re compound, a Mn compound, a Mg compound, and a Si compound so that the earlier-described first requirement is satisfied. It should be noted that Re is at least one element selected from the group consisting of Y, Gd, Tb, Dy, Ho, Er, and Yb. The number of Ba vacancies of the perovskite compound is equal to or more than about $1.2 \times 10^{15}$ per gram and equal to or less than about $4.5 \times 10^{15}$ per gram. For higher reliability, it is preferable to add a V compound and an Al compound to the above compounds so that the earlier-described second requirement is satisfied.

A typical example of the perovskite compound is $BaTiO_3$. The perovskite compound may be, for example, a $BaTiO_3$-based solid solution such as $(Ba,Ca)TiO_3$, $Ba(Ti,Zr)O_3$, $(Ba,Ca)(Ti,Zr)O_3$, or the like. It should be noted that $BaTiO_3$ can be synthesized by a solid reaction method, a hydrothermal synthesis method, an alkoxide method, or a method known as the oxalic acid method.

In terms of controllability of the number of Ba vacancies (described later), controllability of the molar ratio of Ba to Ti, and production costs, the oxalic acid method is preferred. Alternatively, a perovskite compound having a desired composition may be produced by preparing $BaTiO_3$ by a hydrothermal synthesis method or the like, mixing $BaTiO_3$ with various materials, and then calcining the mixture.

The Re compound, Mn compound, Mg compound, Si compound, V compound, and Al compound may be in the form of, for example, a carbonate, an oxide, a hydroxide, a chloride, or the like.

The compounds, which are starting materials, may be mixed together while being ground with the use of a media disperser such as a ball mill. However, in the case where the compounds should not be contaminated by the media, it is preferable to use a medialess disperser such as a jet mill. It should be noted that the dielectric ceramic material may be a mere mixture of the compounds, or may be obtained by mixing the compounds and thereafter calcining the mixture under certain conditions to thereby cause the perovskite compound to pre-react with the other compounds.

Second Step (Step of Forming Green Sheets)

The second step involves forming green sheets that will become the dielectric ceramic layers 4 by converting the dielectric ceramic material obtained in the first step into a slurry and forming the slurry into sheets. The dielectric ceramic material is converted into a slurry usually by mixing the dielectric ceramic material, organic components such as a binder and a plasticizer, and a dispersion medium with the use of a disperser such as one of those which can be used in the first step.

The slurry is formed into sheets usually by applying the dielectric ceramic material in the form of the slurry onto a base with the use of a coater such as a doctor blade or a die coater and a coating machine such as a gravure printing apparatus.

Third Step (Step of Forming Inner Electrode Patterns)

The third step involves forming an inner electrode pattern, which will become the inner electrode 5 or the inner electrode 6, on one main surface of some of the green sheets obtained in the second step. The inner electrode pattern may be formed from a conductive material such as Ni, a Ni alloy, Cu, a Cu alloy, or the like. Usually Ni or a Ni alloy is used. The inner electrode pattern is usually formed from a conductive paste containing the above conductive material in the form of powder by screen printing or a transfer method.

It should be noted that the method of forming the inner electrode pattern is not limited to such. The inner electrode pattern may be formed by any method such as vapor deposition, sputtering, metallic foil transfer, or the like. A plurality of inner electrode patterns may be formed on a single green sheet.

Fourth Step (Step of Forming Unsintered Capacitor Body)

The fourth step involves forming an unsintered capacitor body from the green sheets having the inner electrode patterns thereon obtained in the third step and green sheets having no inner electrode patterns. Specifically, a necessary number of green sheets having the inner electrode patterns thereon are stacked together and the stack of these green sheets is sandwiched between a suitable number of green sheets having no inner electrode patterns. It should be noted that the green sheets with the inner electrode patterns are stacked together in a manner such that those with the inner electrode patterns which will become the inner electrodes 5 and those with the inner electrode patterns which will become the inner electrodes 6 are arranged in an alternating manner. The stack of the sheets is bonded by thermocompression bonding, whereby an unsintered capacitor body is obtained.

The stacking and thermocompression bonding of the green sheets may be performed in the following manner.

That is, the green sheets mentioned in the description of the third step, each of which has a plurality of inner electrode patterns thereon, may be stacked together and bonded together so that the bonded stack includes a plurality of unsintered capacitor bodies. By cutting the obtained bonded stack, it is possible to effectively prepare a plurality of unsintered capacitor bodies.

Fifth Step (Sintering Step)

The fifth step involves obtaining the capacitor body 1 by sintering the unsintered capacitor body obtained in the fourth step. The unsintered capacitor body is dewaxed if needed and thereafter sintered at a certain temperature in a certain reducing atmosphere, whereby the sintered capacitor body 1 is obtained. The unsintered capacitor body may be sintered with the use of a batch furnace or a continuous furnace. The continuous furnace may have a dewaxing zone therein.

Next, the outer electrode 2 is formed on the end face 7 of the sintered capacitor body 1 so as to be electrically connected to the inner electrodes 5. Similarly, the outer electrode 3 is formed on the end face 8 so as to be electrically connected to the inner electrodes 6. The outer electrodes 2 and 3 may be formed from a conductive material such as Ni, a Ni alloy, Cu, a Cu alloy, Ag, or a Ag alloy. Usually, Cu or a Cu alloy is used. The outer electrodes 2 and 3 are formed usually by applying, onto the end faces 7 and 8 of the capacitor body 1 respectively, a conductive paste containing a glass frit and conductive powder and baking the conductive paste.

It should be noted that the conductive paste, which will become the outer electrodes 2 and 3, may be applied to the unsintered capacitor body and then baked while the unsintered capacitor body is sintered to become the capacitor body 1. Furthermore, the outer electrodes 2 and 3 may be coated with a first plating layer made of, for example, Ni or Cu if needed. Furthermore, the first plating layer may be coated with a second plating layer made of, for example, Sn or solder. In this way, the multilayer ceramic capacitor 10 is obtained.

<Experiments>

The following more specifically describes the present disclosure on the basis of experiments. The following experiments also serve to provide support for the amounts, or preferred amounts, of elements contained in dielectric ceramic layers of a multilayer ceramic capacitor of the present disclosure. In the following experiments, multilayer ceramic capacitors as shown in FIGS. 1 and 2 were prepared as samples.

Preparation of Dielectric Ceramic Material

The oxalic acid method was used to synthesize $BaTiO_3$ powder from $Ba(NO_3)_2$ powder and $TiCl_4$ powder. Each powder was weighed so that the molar ratio of Ba to Ti was about 1.000 and thereafter mixed together in an oxalic acid aqueous solution, whereby a precipitate of $BaTiO(C_2O_4)$ $.4H_2O$ was obtained. Then, the precipitate was dried in an oven. The dried precipitate was pyrolyzed at two temperatures not lower than about 1000° C. In this way, $BaTiO_3$ powders A and B shown in Table 1 were synthesized.

Another $BaTiO_3$ powder was synthesized by a solid reaction method from $BaCO_3$ powder and $TiO_2$ powder. Each powder was weighed so that the molar ratio of Ba to Ti was about 1.000 and thereafter mixed with pure water and a dispersant before being ground and crushed with a forced-circulation-type wet mill. The media of the wet mill were partially stabilized zirconia (PSZ) balls. It has been confirmed that the contamination from the PSZ does not affect the reliability of a multilayer ceramic capacitor 10 (described later).

The obtained slurry was dried in an oven to obtain powder, and thereafter the obtained powder was reacted at three temperatures not lower than about 950° C. In this way, $BaTiO_3$ powders C, D, and E shown in Table 1 were synthesized.

Each $BaTiO_3$ powder was observed under a scanning electron microscope (SEM) at 50000× magnification and images were recorded. In the obtained SEM image, 200 or more primary particles were randomly selected. It should be noted here that the term "primary particles" denotes the geometrically simplest particles which constitute the powder. The inner area of each selected primary particle was determined by image analysis and a circle-equivalent diameter was calculated. The obtained diameter was used as the diameter of the primary particle. For each $BaTiO_3$ powder, the median diameter $D_{50}$ of the primary particle size distribution was calculated. The median diameter $D_{50}$ of the primary particles of each $BaTiO_3$ powder obtained in this way is shown in Table 1.

The sum of the amounts of Ca and Sr (molar part of Ca and Sr with respect to 100 molar parts of Ti in the synthesized $BaTiO_3$ powder) was determined with the use of an inductively coupled plasma-atomic emission spectrometer (ICP-AES). These Ca and Sr are derived from impurities contained in ingredients, impurities which have been mixed in during synthesis, or the like. The sum of the amounts of Ca and Sr in each $BaTiO_3$ powder thus determined is shown in Table 1.

The number of Ba vacancies was determined with the use of an electron spin resonance (ESR) spectrometer. Each Ba vacancy which has captured a positive hole and thus has a relative charge of −1 generates a detectable ESR signal. Such a Ba vacancy having a charge of −1 shows an ESR signal at a g-factor of about 2.00. Not only the $BaTiO_3$ powder but also a standard sample ($CuSO_4$ powder) was subjected to ESR spectrometry to determine the number of spins. The number of spins was determined from the integrated area in the Ba vacancy signal. The settings of the ESR spectrometer were as follows: microwave range was the X band; the resonator was in TE011 mode; and cooling conditions and microwave output conditions were optimized for high sensitivity.

It should be noted that the number of Ba vacancies was determined within about 30 days from the synthesis of each $BaTiO_3$ powder. The powder was stored in a dry cage at room temperature. The number of Ba vacancies of each $BaTiO_3$ powder thus determined is shown in Table 1.

TABLE 1

| type of $BaTiO_3$ | circle-equivalent diameter $D_{50}$ (μm) | amount of (Ca + Sr) (molar part with respect to 100 molar parts of Ti) | number of Ba vacancies (×$10^{15}$ vacancies/g) |
|---|---|---|---|
| A | 0.21 | 0.20 | 1.0 |
| B | 0.20 | 0.15 | 1.2 |
| C | 0.21 | 0.13 | 4.5 |
| D | 0.19 | 0.09 | 6.9 |
| E | 0.23 | 0.06 | 8.6 |

Ingredients for the dielectric ceramic material other than the $BaTiO_3$ powder were $BaCO_3$ powder, $TiO_2$ powder, $Y_2O_3$ powder, $Gd_2O_3$ powder, $Tb_2O_3$ powder, $Dy_2O_3$ powder, $Ho_2O_3$ powder, $Er_2O_3$ powder, $Yb_2O_3$ powder, MnO powder, MgO powder, $V_2O_5$ powder, and $Al_2O_3$ powder, which were greater than about 99% pure, and colloidal silica. The colloidal silica contained about 20 wt % of a Si oxide ($SiO_2$ equivalent).

The ingredients other than the $BaTiO_3$ powder, and each of $BaTiO_3$ powders A to E, were subjected to adjustment depending on the purity of starting materials and thereafter weighed and mixed together so that the molar parts of the elements with respect to 100 molar parts of Ti were as shown in Table 2. It should be noted that the Ba/Ti ratio, defined as m, which is shown in Table 2 was adjusted by adding $BaCO_3$ or $TiO_2$ during mixing.

After the ingredients were mixed with each of $BaTiO_3$ powders A to E, pure water was added to the mixture and wet-mixed with the use of a ball mill using PSZ balls as media, whereby the mixture was converted into a slurry. The obtained slurry was evaporated to dryness and then granulated. In this way, dielectric ceramic material powders corresponding to material numbers 1 to 39 shown in Table 2 were obtained.

TABLE 2

| | material number | type of $BaTiO_3$ | Re (molar part) | | | | | | | Re in total (molar part) a | Mn (molar part) b | Mg (molar part) c | Si (molar part) d | V (molar part) e | Al (molar part) f | Ba/Ti ratio m |
|---|---|---|---|---|---|---|---|---|---|---|---|---|---|---|---|---|
| | | | Y | Gd | Tb | Dy | Ho | Er | Yb | | | | | | | |
| * | 1 | B | 0 | 0 | 0 | 0 | 0 | 0 | 0 | 0 | 0.0050 | 0.012 | 0.010 | 0.002 | 0.001 | 1.010 |
| * | 2 | B | 0 | 0 | 0 | 0.016 | 0 | 0.004 | 0 | 0.020 | 0 | 0.012 | 0.010 | 0.002 | 0.001 | 1.010 |
| * | 3 | B | 0 | 0 | 0 | 0.016 | 0 | 0.004 | 0 | 0.020 | 0.0050 | 0.012 | 0.010 | 0.002 | 0.001 | 0.990 |
| * | 4 | B | 0 | 0 | 0 | 0 | 0.02 | 0 | 0 | 0.020 | 0.0050 | 0.010 | 0.010 | 0.002 | 0.001 | 1.000 |
| * | 5 | B | 0 | 0 | 0 | 0.016 | 0 | 0 | 0 | 0.016 | 0.0080 | 0.012 | 0 | 0.002 | 0.001 | 1.015 |
| * | 6 | B | 0 | 0 | 0 | 0 | 0.015 | 0 | 0 | 0.015 | 0.0075 | 0.015 | 0.001 | 0.002 | 0.001 | 1.015 |
| | 7 | B | 0 | 0.001 | 0 | 0 | 0 | 0 | 0 | 0.001 | 0.0005 | 0.015 | 0.002 | 0.0001 | 0 | 1.015 |
| | 8 | B | 0 | 0.001 | 0 | 0 | 0 | 0 | 0 | 0.001 | 0.0005 | 0.015 | 0.002 | 0 | 0.0001 | 1.015 |
| | 9 | B | 0 | 0.001 | 0 | 0 | 0 | 0 | 0 | 0.001 | 0.0005 | 0.015 | 0.002 | 0.0001 | 0.0001 | 1.015 |
| | 10 | C | 0 | 0.001 | 0 | 0 | 0 | 0 | 0 | 0.001 | 0.0005 | 0.015 | 0.002 | 0.0001 | 0.0001 | 1.015 |
| | 11 | B | 0 | 0 | 0 | 0.004 | 0.016 | 0 | 0 | 0.020 | 0.0100 | 0 | 0.010 | 0.002 | 0.001 | 1.010 |
| | 12 | B | 0 | 0 | 0 | 0.015 | 0 | 0 | 0.005 | 0.020 | 0.0080 | 0.010 | 0.010 | 0.002 | 0.001 | 1.001 |
| | 13 | B | 0.015 | 0.005 | 0 | 0 | 0 | 0 | 0 | 0.020 | 0.0080 | 0.010 | 0.010 | 0.002 | 0.001 | 1.005 |
| | 14 | B | 0.005 | 0 | 0 | 0.012 | 0 | 0 | 0 | 0.017 | 0.0080 | 0.015 | 0.015 | 0.002 | 0.001 | 1.010 |
| | 15 | B | 0 | 0 | 0 | 0.012 | 0 | 0 | 0.012 | 0.024 | 0.0080 | 0.015 | 0.015 | 0.002 | 0.001 | 1.010 |
| | 16 | B | 0 | 0 | 0.006 | 0 | 0 | 0.012 | 0 | 0.018 | 0.0090 | 0.012 | 0.015 | 0.002 | 0.001 | 1.010 |
| | 17 | B | 0 | 0 | 0.008 | 0 | 0.008 | 0 | 0 | 0.016 | 0.0080 | 0.012 | 0.010 | 0.002 | 0.001 | 1.015 |
| | 18 | B | 0 | 0 | 0 | 0.03 | 0 | 0.02 | 0 | 0.050 | 0.0400 | 0.010 | 0.020 | 0.002 | 0.001 | 1.010 |

TABLE 2-continued

| material number | type of BaTiO₃ | Re (molar part) | | | | | | | Re in total (molar part) a | Mn (molar part) b | Mg (molar part) c | Si (molar part) d | V (molar part) e | Al (molar part) f | Ba/Ti ratio m |
|---|---|---|---|---|---|---|---|---|---|---|---|---|---|---|---|
| | | Y | Gd | Tb | Dy | Ho | Er | Yb | | | | | | | |
| 19 | B | 0 | 0 | 0 | 0.03 | 0.02 | 0 | 0 | 0.050 | 0.0400 | 0.012 | 0.020 | 0.005 | 0.001 | 1.015 |
| *20 | B | 0 | 0 | 0 | 0.03 | 0 | 0.02 | 0 | 0.050 | 0.0500 | 0.010 | 0.020 | 0.002 | 0.001 | 1.010 |
| 21 | B | 0 | 0 | 0 | 0.03 | 0.02 | 0 | 0 | 0.050 | 0.0400 | 0.012 | 0.020 | 0.007 | 0.001 | 1.015 |
| 22 | B | 0 | 0 | 0 | 0.03 | 0.02 | 0 | 0 | 0.050 | 0.0080 | 0 | 0.020 | 0.002 | 0.001 | 1.015 |
| 23 | B | 0 | 0 | 0.016 | 0 | 0 | 0 | 0 | 0.016 | 0.0060 | 0.030 | 0.050 | 0.002 | 0.001 | 1.005 |
| 24 | B | 0.004 | 0 | 0.016 | 0 | 0 | 0 | 0 | 0.020 | 0.0060 | 0.030 | 0.050 | 0.002 | 0.001 | 1.005 |
| 25 | B | 0 | 0 | 0.016 | 0 | 0 | 0 | 0 | 0.016 | 0.0060 | 0.030 | 0.020 | 0.002 | 0.003 | 1.005 |
| 26 | B | 0 | 0 | 0.016 | 0 | 0 | 0 | 0 | 0.016 | 0.0060 | 0.030 | 0.020 | 0.002 | 0.005 | 1.005 |
| 27 | B | 0 | 0 | 0 | 0 | 0 | 0.016 | 0.004 | 0.020 | 0.0050 | 0.010 | 0.015 | 0.002 | 0.001 | 1.010 |
| 28 | B | 0 | 0.004 | 0 | 0 | 0 | 0.016 | 0 | 0.020 | 0.0050 | 0.010 | 0.015 | 0.002 | 0.001 | 1.010 |
| 29 | B | 0 | 0 | 0 | 0.02 | 0 | 0 | 0 | 0.020 | 0.0050 | 0.010 | 0.015 | 0.002 | 0.001 | 1.010 |
| 30 | B | 0 | 0 | 0 | 0 | 0.012 | 0 | 0 | 0.012 | 0.0240 | 0.001 | 0.025 | 0.002 | 0.001 | 1.010 |
| 31 | B | 0 | 0 | 0 | 0.016 | 0 | 0 | 0.024 | 0.040 | 0.0050 | 0.020 | 0.015 | 0.002 | 0.001 | 1.035 |
| 32 | C | 0 | 0 | 0 | 0.016 | 0 | 0 | 0.024 | 0.040 | 0.0050 | 0.020 | 0.015 | 0.002 | 0.001 | 1.035 |
| *33 | B | 0 | 0 | 0 | 0 | 0.04 | 0 | 0.02 | 0.060 | 0.0150 | 0.020 | 0.015 | 0.002 | 0.001 | 1.015 |
| *34 | B | 0 | 0 | 0 | 0.02 | 0 | 0 | 0 | 0.020 | 0.0050 | 0.012 | 0.020 | 0.002 | 0.001 | 1.045 |
| *35 | B | 0 | 0 | 0 | 0.02 | 0 | 0 | 0 | 0.020 | 0.0050 | 0.040 | 0.020 | 0.002 | 0.001 | 1.010 |
| *36 | B | 0 | 0 | 0 | 0.02 | 0 | 0 | 0 | 0.020 | 0.0050 | 0.012 | 0.060 | 0.002 | 0.001 | 1.010 |
| *37 | A | 0 | 0 | 0 | 0.02 | 0 | 0 | 0 | 0.020 | 0.0050 | 0.012 | 0.015 | 0.002 | 0.001 | 1.010 |
| *38 | D | 0 | 0 | 0 | 0.02 | 0 | 0 | 0 | 0.020 | 0.0050 | 0.012 | 0.015 | 0.002 | 0.001 | 1.010 |
| *39 | E | 0 | 0 | 0 | 0.02 | 0 | 0 | 0 | 0.020 | 0.0050 | 0.012 | 0.015 | 0.002 | 0.001 | 1.010 |

* denotes outside the scope of the present disclosure.

Forming Green Sheet

The dielectric ceramic material powders corresponding to material numbers 1 to 39 were each mixed with a polyvinyl butyral binder and ethanol and the like and wet-mixed with the use of a ball mill using PSZ balls as media and thereby the mixture was converted into a slurry. The obtained dielectric ceramic material in the form of a slurry was formed into a sheet with the use of a doctor blade so that the resulting sintered dielectric ceramic layer would be about 2.0 μm in thickness. In this way, green sheets made from each dielectric ceramic material were obtained.

Forming Inner Electrode Pattern

Inner electrode patterns were formed by screen printing on some of the green sheets thus made from each dielectric ceramic material. The inner electrode patterns were made from a conductive paste containing Ni powder as a conductive material.

Forming Unsintered Capacitor Body

The green sheets having the inner electrode patterns thereon were stacked together so that the inner electrode patterns overlapped each other to constitute electrostatic capacities, and the stack was sandwiched between some green sheets having no inner electrode patterns thereon. The obtained stack of green sheets was bonded by thermocompression bonding, whereby an unsintered capacitor body was obtained. It should be noted here that a portion of the bonded unsintered capacitor body which had no inner electrode patterns therein had a thickness of about 100 μm.

The stacking and thermocompression bonding of the green sheets were performed in the following manner. That is, green sheets each having a plurality of inner electrode patterns as described earlier were stacked and bonded together so that the bonded stack would include a plurality of unsintered capacitor bodies. Then, the obtained bonded stack was cut into a plurality of unsintered capacitor bodies.

Dewaxing and Sintering of Unsintered Capacitor Body

Each of the unsintered capacitor bodies thus obtained was left to stand at about 250° C. for about 3 hours in an $N_2$ atmosphere and thereby dewaxed. The dewaxed, unsintered capacitor body was left to stand at a temperature of not lower than about 1220° C. and not higher than about 1300° C. for about 2 hours in a reducing atmosphere and thereby sintered. In this way, a sintered capacitor body was obtained. The reducing atmosphere contained a $N_2$—$H_2$—$H_2O$ gas mixture. The oxygen partial pressure $PO_2$ was set to $10^{-9}$ MPa, at which Ni in the inner electrodes would not oxidize at the foregoing temperatures.

A conductive paste containing Cu powder as a conductive material was applied on the opposite end faces of the sintered capacitor body and baked at about 850° C. in an $N_2$ atmosphere, whereby outer electrodes were formed. It should be noted that the conductive paste contained a $B_2O_3$—$Li_2O$—$SiO_2$—$BaO$ glass frit as well as the Cu powder. Further note that the outer electrodes were electrically connected to the inner electrodes exposed on the end faces of the sintered capacitor body.

Next, a Ni plating layer was formed on the surface of each outer electrode by barrel plating, and then a Sn plating layer was formed on the Ni plating layer by barrel plating. In this way, multilayer ceramic capacitors corresponding to sample numbers 1 to 39 shown in Table 3 were obtained.

The multilayer ceramic capacitors corresponding to sample numbers 1 to 39 thus obtained had outside dimensions of about 1.3 mm in width, about 2.0 mm in length, and about 1.3 mm in thickness. In each of the multilayer ceramic capacitors, the area of overlap of inner electrodes which constitute an electrostatic capacity was about 1.7 mm² per layer.

Measuring Thickness of Dielectric Ceramic Layer

Three samples of each of the multilayer ceramic capacitors corresponding to sample numbers 1 to 39 were prepared. Each of the three sample multilayer ceramic capacitors having the same sample number was held so that its width (W) was parallel to the vertical direction and the sample was encapsulated in resin, and its L-T face defined by the length (L) and the thickness (T) was exposed out of the resin. Next, the L-T face of the sample was polished with a polisher to about half the width (W) of the sample. Then, the polished surface was subjected to ion milling and thereby the spread-out portions, which were spread out when polished, of the inner electrodes were removed.

Figure 3:
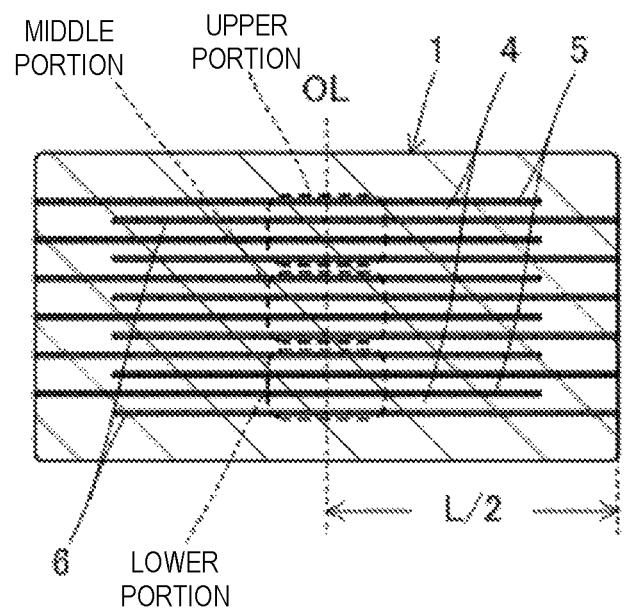
FIG. 3 describes a way to measure the thicknesses of dielectric ceramic layers of the multilayer ceramic capacitor shown in FIG. 1.

In each polished sample thus obtained, a line (normal line) OL normal to the dielectric ceramic layers was drawn in substantially the middle of the length (L) of the L-T face (see FIG. 3). A portion in which the dielectric ceramic layers contribute to the electrostatic capacities was divided into the following three portions stacked on top of each other along the thickness (T): an upper portion; a middle portion; and a lower portion.

Then, the thicknesses, along the normal line OL, of ten dielectric ceramic layers were measured in the middle of each portion and the mean was calculated. These ten layers included neither the outermost dielectric ceramic layers in each portion nor two or more dielectric ceramic layers contacting each other due to absence of inner electrodes. That is, the thicknesses of ten layers were measured in each of the three portions in each of the three samples. That is, the number of measurements used to calculate the mean was 90. As a result, it was found that the average thickness of the dielectric ceramic layers in each of the sample capacitors corresponding to sample numbers 1 to 39 was about 2.0 µm. It should be noted that the thickness of each dielectric ceramic layer was measured with an SEM.

Evaluating Reliability of Multilayer Ceramic Capacitor Under High-Temperature Load Fifty samples of each of multilayer ceramic capacitors 10 corresponding to sample numbers 1 to 39, which were formed in the foregoing manner, were prepared. Each of the fifty sample multilayer ceramic capacitors having the same sample number was subjected to a high-temperature loading test at about 125° C. at a DC voltage of about 25 V and the change in resistance with time of each sample was observed. The intensity of the electric field applied across the dielectric ceramic layers was calculated from the thickness of each dielectric ceramic layer measured earlier and the applied voltage, and found to be about 12.5 kV/mm.

Of the fifty multilayer ceramic capacitors having the same sample number, those which had a resistance of equal to or less than about 1 MΩ were determined to be defective. Table 3 shows the sintering temperatures, defect rates (the number of defective samples in fifty samples) after 1000 hours of loading at high temperature, and defect rates after 2000 hours of loading at high temperature, of the multilayer ceramic capacitors.

TABLE 3

| | sample number | sintering temperature (° C.) | high-temperature loading test defect rate after 1000 h | high-temperature loading test defect rate after 2000 h |
|---|---|---|---|---|
| * | 1 | 1240 | 50/50 | 50/50 |
| * | 2 | 1300 | 50/50 | 50/50 |
| * | 3 | 1240 | 50/50 | 50/50 |
| * | 4 | 1240 | 50/50 | 50/50 |
| * | 5 | 1240 | 50/50 | 50/50 |
| * | 6 | 1240 | 10/50 | 14/50 |
| | 7 | 1240 | 0/50 | 1/50 |
| | 8 | 1240 | 0/50 | 1/50 |
| | 9 | 1240 | 0/50 | 0/50 |
| | 10 | 1240 | 0/50 | 0/50 |
| | 11 | 1240 | 0/50 | 0/50 |
| | 12 | 1220 | 0/50 | 0/50 |
| | 13 | 1220 | 0/50 | 0/50 |
| | 14 | 1240 | 0/50 | 0/50 |
| | 15 | 1240 | 0/50 | 0/50 |
| | 16 | 1240 | 0/50 | 0/50 |
| | 17 | 1280 | 0/50 | 0/50 |
| | 18 | 1280 | 0/50 | 0/50 |
| | 19 | 1260 | 0/50 | 0/50 |
| * | 20 | 1280 | 1/50 | 4/50 |
| | 21 | 1260 | 0/50 | 1/50 |
| | 22 | 1240 | 0/50 | 0/50 |
| | 23 | 1220 | 0/50 | 0/50 |
| | 24 | 1220 | 0/50 | 0/50 |
| | 25 | 1240 | 0/50 | 0/50 |
| | 26 | 1240 | 0/50 | 2/50 |
| | 27 | 1280 | 0/50 | 0/50 |
| | 28 | 1240 | 0/50 | 0/50 |
| | 29 | 1240 | 0/50 | 0/50 |
| | 30 | 1260 | 0/50 | 0/50 |
| | 31 | 1240 | 0/50 | 0/50 |
| | 32 | 1240 | 0/50 | 0/50 |
| * | 33 | 1280 | 8/50 | 17/50 |
| * | 34 | 1280 | 21/50 | 50/50 |
| * | 35 | 1240 | 4/50 | 9/50 |
| * | 36 | 1220 | 16/50 | 44/50 |
| * | 37 | 1240 | 2/50 | 7/50 |
| * | 38 | 1240 | 5/50 | 9/50 |
| * | 39 | 1240 | 12/50 | 29/50 |

* denotes outside the scope of the present disclosure.

In Table 3, the symbols "*" next to sample numbers denote multilayer ceramic capacitors in which the number of Ba vacancies is outside a range specified in the present disclosure or the amounts of elements do not satisfy the first requirement specified in the present disclosure.

As is clear from Tables 2 and 3, each sample multilayer ceramic capacitor in which the number of Ba vacancies falls within a specified range and the amounts of elements satisfy the first requirement was found to be not defective even after 1000 hours of a high-temperature loading test under the foregoing conditions. Furthermore, each sample multilayer ceramic capacitor in which the number of Ba vacancies falls within a specified range and the amounts of elements satisfy the second requirement was found to be not defective even after 2000 hours and was found to be preferable. That is, the experiments demonstrated that a multilayer ceramic capacitor produced by a method of the present disclosure is highly reliable.

In contrast, each sample multilayer ceramic capacitor in which the number of Ba vacancies is outside a range specified in the present disclosure or the amounts of elements do not satisfy the first requirement specified in the present disclosure was found to be defective after 1000 hours of a high-temperature loading test under the foregoing conditions and found to be not preferable.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A method for producing a multilayer ceramic capacitor, the method comprising:
    1) preparing a dielectric ceramic material by mixing a perovskite compound, a rare earth compound, a manganese compound, a magnesium compound, and a silicon compound, the perovskite compound containing barium and titanium and an amount of barium vacancies in the perovskite compound being in a range of $1.2 \times 10^{15}$ or more vacancies per gram and $4.5 \times 10^{15}$ or less vacancies per gram, a rare earth element in the rare earth compound is at least one element selected from the group consisting of yttrium, gadolinium, terbium, dysprosium, holmium, erbium, and ytterbium, with respect to 1 molar part of the titanium:
- an amount a of the rare earth element: 0.0010 molar parts $\leq a \leq$ 0.050 molar parts,
- an amount b of manganese: 0.0005 molar parts $\leq b \leq$ 0.040 molar parts,
- an amount c of magnesium: 0 molar part$\leq c \leq$0.030 molar parts,
- an amount d of silicon: 0.0020 molar parts $\leq d \leq$0.050 molar parts, and
- a molar ratio m of the barium to the titanium: $1.001 \leq m \leq 1.035$;

2) forming a plurality of green sheets containing the dielectric ceramic material;

3) forming inner electrode patterns on a set of green sheets of the plurality of green sheets;

4) forming an unsintered capacitor body by stacking the plurality of green sheets; and 5) sintering the unsintered capacitor body to form a sintered capacitor body having dielectric ceramic layers and internal electrodes disposed between the dielectric ceramic layers.

2. The method according to claim 1, wherein step 1) includes adding a vanadium compound and an aluminum compound when preparing the dielectric ceramic material so that, with respect to 1 molar part of the titanium:
- an amount e of vanadium: 0.00010 molar parts$\leq e \leq$0.0050 molar parts; and
- an amount f of aluminum: 0.00010 molar parts$\leq f \leq$0.0030 molar parts.

3. The method according to claim 1, further comprising forming outer electrodes at respective different positions on an outer surface of the sintered capacitor body so as to be electrically connected to different sets of the internal electrodes.

4. The method according to claim 1, wherein the perovskite compound is barium titanate.

* * * * *